Patented Mar. 11, 1924.

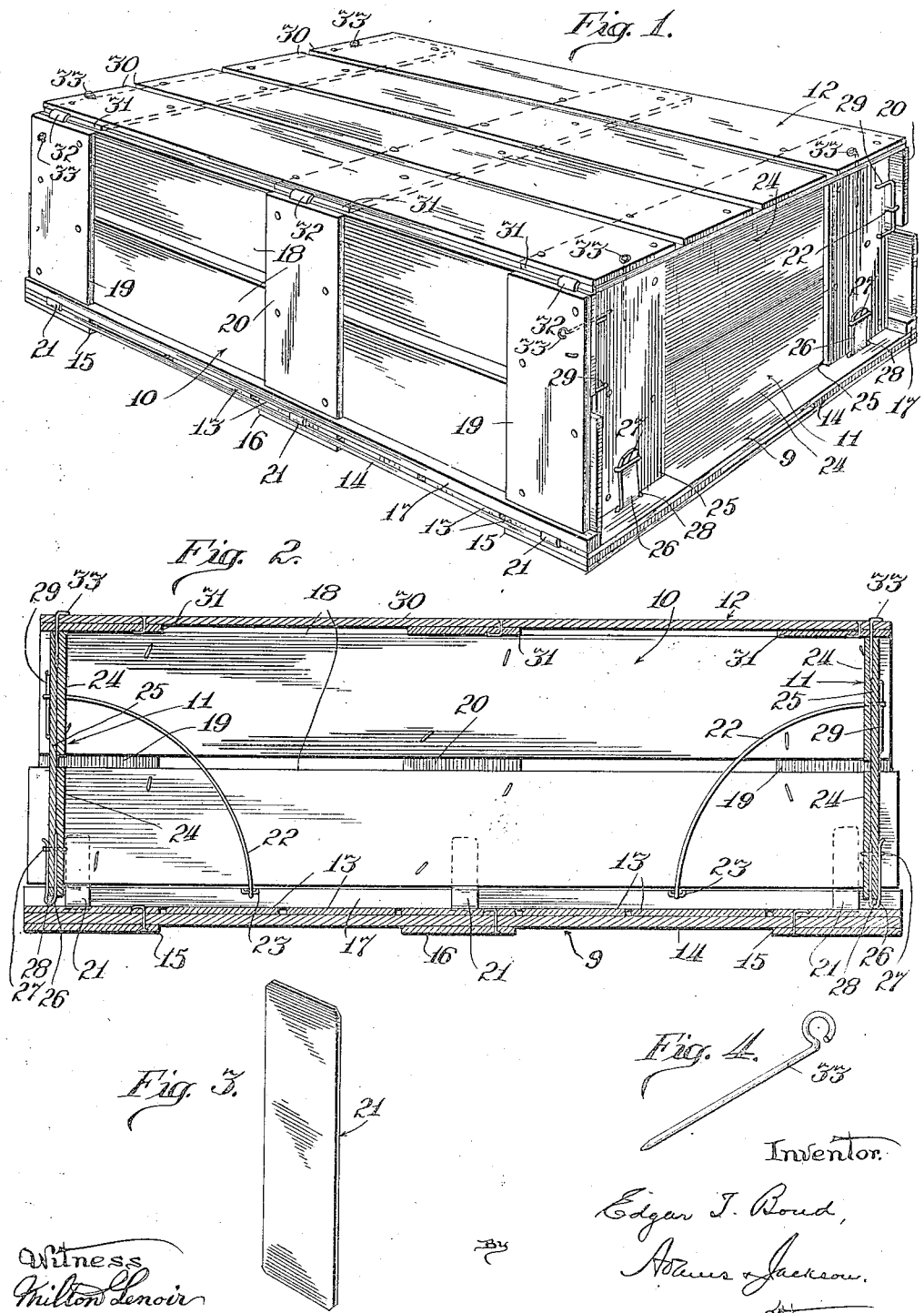

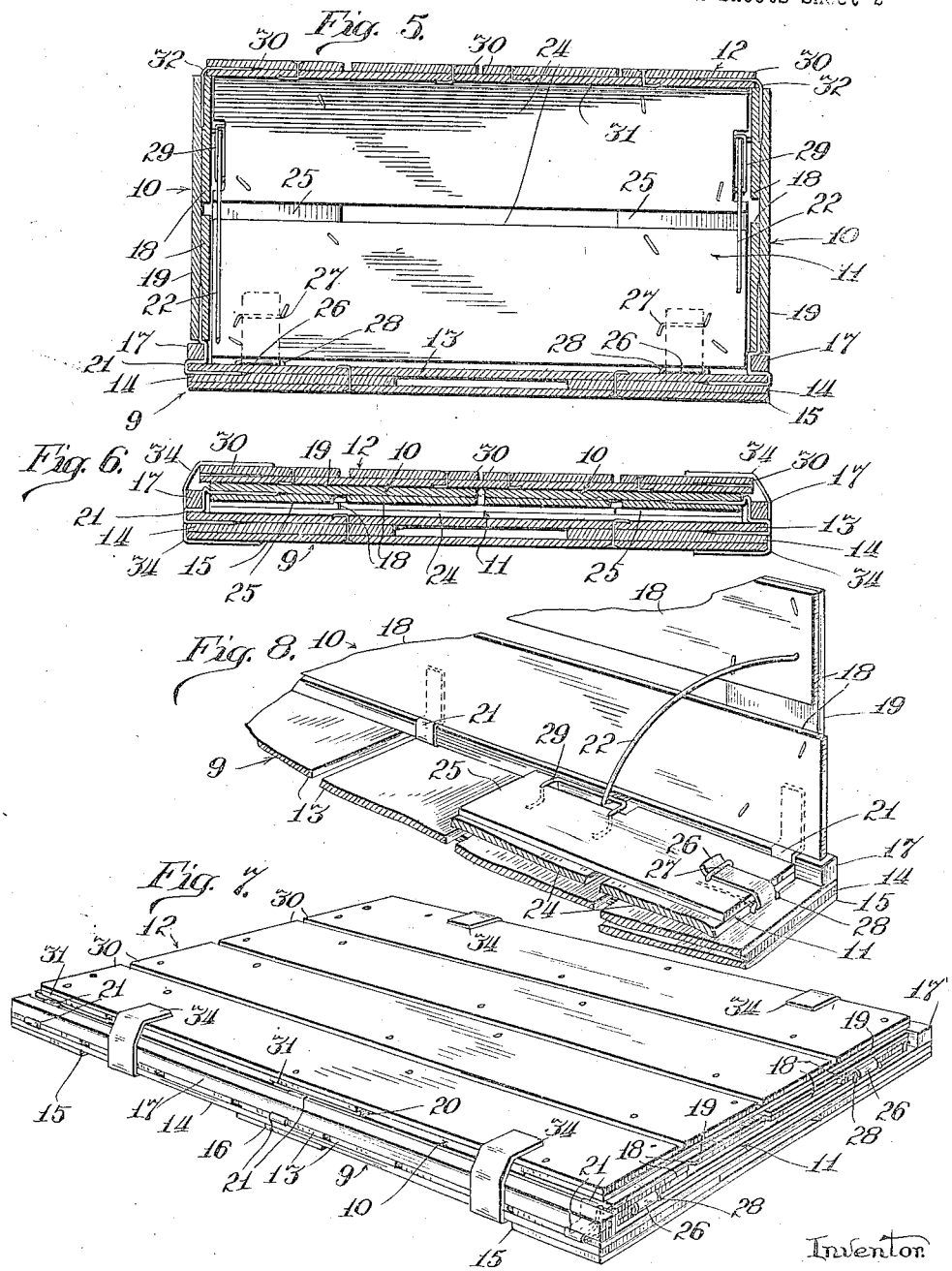

1,486,478

UNITED STATES PATENT OFFICE.

EDGAR T. BOND, OF CHICAGO, ILLINOIS.

KNOCKDOWN CRATE.

Application filed January 31, 1921. Serial No. 441,331.

*To all whom it may concern:*

Be it known that I, EDGAR T. BOND, a citizen of the United States, and a resident of Chicago, in the county of Cook and State of Illinois, have invented certain new and useful Improvements in Knockdown Crates, of which the following is a specification, reference being had to the accompanying drawings.

My invention relates to knock-down or folding boxes or crates designed for receiving for transportation light articles of merchandise, or poultry, &c. For the shipment of poultry especially there has long been a demand for a crate which can be folded into compact form for shipment to the point where the poultry is to be loaded and can there be easily set up without the use of special tools so as to provide a strong and substantial receptacle for the poultry, and to provide a crate which will meet the requirements of that business is the object of my invention. This object I accomplish as illustrated in the drawings and hereinafter described. What I regard as new is set forth in the claims.

In the accompanying drawings I have illustrated my improvements as embodied in the form of a crate, but it will be understood that they may also be embodied in a comparatively tight box, and, therefore, the terms "crate" and "box" are herein used synonymously.

In the accompanying drawings,—

Fig. 1 is a perspective view of my improved crate;

Fig. 2 is a central longitudinal section thereof;

Fig. 3 is a perspective view of one of the straps used in making the hinges;

Fig. 4 is a perspective view of one of the pins used for securing the cover in place;

Fig. 5 is a vertical cross-section of the crate;

Fig. 6 is a cross-section showing the crate knocked down for shipment;

Fig. 7 is a perspective view of the crate in its knocked down condition; and

Fig. 8 is a perspective view showing part of the crate with one of the end pieces folded.

Referring to the drawings, 9 indicates the bottom of the crate, 10 the side pieces, 11 the end pieces, and 12 the top or cover. In the construction shown the bottom 9 is composed of a series of cross strips 13 connected together by longitudinal strips 14 secured to the end portions of the cross strips 13 by nails or in any other suitable way. The bottom is reinforced by additional cross strips 15 secured to the under sides of the longitudinal strips 14 at the ends thereof, as shown in Fig. 2, and an intermediate cross strip 16 located about midway of the length of the longitudinal strips. The side margins of the bottom 9 are also provided with narrow longitudinal strips 17 which rest on the ends of the cross strips 13, as shown in Fig. 1, and are securely nailed thereto.

The side pieces 10 also are composed of longitudinal strips 18 connected by outside cross strips 19 at the end portions thereof and by intermediate strips 20, as shown in Fig. 1. These side pieces are pivotally connected with the side marginal portions of the bottom 9 by flat metal strap hinges 21, the arrangement of which is best shown in Fig. 5. As therein shown, the straps 21, any desired number of which may be used, preferably three, are applied by forcing one end thereof telescopically in between the cross strips 13 and the longitudinal strips 14. The other end of the strap is then inserted telescopically between the longitudinal strip 17 and the cross strip 13, thus folding the strap over the end of the cross strip 13 and between it and the longitudinal strip 17. The inner end of the strap is then bent upward over the inner face of the longitudinal strip 17 and is inserted between the lower longitudinal strip 18 of the side piece and the cross piece 19 thereof. The ends of the strap fit tightly in place and are held by friction, but if desired the side piece may be removed by pulling it upward with sufficient force to extract the end of each strap from its socket. By this construction also the side piece is capable of being folded down over the bottom piece as the flexibility of the straps allows them to bend sufficiently to permit such folding of the side piece. The position of these parts when folded is clearly shown in Fig. 6.

The side pieces 10 are provided at their inner faces near their ends with curved guide wires 22, the upper ends of which are connected with the end portions of the side pieces while their lower ends are bent outwardly at right angles and are pivotally connected with the inner faces of the side strips 17, this being preferably accomplished by looping the wires 22 around clips 23 secured to the side strips 17, as shown in Fig. 2. These wires 20 are substantially the same as those shown and described in Letters Patent No. 1,318,532, granted to me October 14, 1919.

The end pieces 11 also are formed of longitudinal strips 24 connected at their ends by cross strips 25, and they are hinged to the bottom 9 by means of metal straps 26 which are folded to U-shape and are secured to the lower marginal portions of the end pieces so that a loop projects beyond the lower margin thereof, as shown in Fig. 2. These straps are secured to the end pieces by fitting one end of the strap telescopically between the lower longitudinal piece 24 and the cross piece 25, the other end of the strap overlapping the cross strip 25. A staple 27 which embraces the outer end of the strap 26 and is secured to the end piece serves to hold the strap in position under ordinary conditions, but permits the outer end of the strap to be withdrawn when desired. The loop portion of the strap is connected with the bottom piece 9 by a staple 28 secured to said bottom piece, as shown in Figs. 1 and 2. Thus the end piece is hinged to the bottom piece so that it may fold down upon it, as shown in Fig. 8. The upper end portions of the end pieces are provided with stirrups 29 or loops which embrace the guide wires 20 in the manner described in my said patent and serve to hold the side pieces 10 against outward movement when they are in operative position. It will be apparent that when the end pieces are folded down the stirrups 29 travel along the guide wires 20 until the end pieces are folded down upon the bottom, after which the side pieces may be folded over upon the bottom and end pieces. In order to permit close folding the stirrups 29 are offset slightly, as shown in Figs. 1 and 8.

The top piece or cover 12 also is composed of longitudinal strips 30 and cross strips 31, and it is connected with the side pieces 10 by straps 32, the ends of which fit between the longitudinal strips 18 and cross strips 19 of the side pieces, and between the longitudinal strips 30 and cross strips 31 of the cover, as best shown in Figs. 1 and 5. The cover is secured to the end pieces by pins 33 which pass through the end portions of the cover and fit between the longitudinal strips 24 and cross strips 25 of the end pieces, as shown in Fig. 2. Thus the cover is secured both to the side pieces and to the end pieces, but it may readily be disconnected by withdrawing the pins 33 and slipping one end of the straps 32 out of engagement with the part into which they are fitted. Also the cover may be swung as on a hinge by removing the pins 33 and disconnecting the straps 32 at one side margin only of the cover, the straps at the other side margin forming the hinge. When the crate is to be knocked down the cover and the straps 32 are removed, and after the end pieces and side pieces are folded in the manner shown in Fig. 6 the cover may be laid upon the folded side pieces as shown in said figure and in Fig. 7, thus making a compact bundle for shipment. When the parts are so folded they may be held together by clips 34 slipped over the edges thereof, as shown in Figs. 6 and 7, or they may be strapped together in any other suitable way. From the foregoing description it will be seen that my improved crate may readily be knocked down or set up without the use of special tools, that when knocked down it forms a very compact bundle, and that when set up it constitutes a substantial crate or box which is well adapted for shipment of light articles.

If desired, the pins 33 may also be inserted through the ends of the side pieces into the ends of the end pieces, as shown in Fig. 1, thereby more firmly securing these parts together and increasing the rigidity of the crate when set up.

What I claim as my invention and desire to secure by Letters Patent, is—

1. In a knock-down crate, the combination with a bottom and end pieces, of means pivotally connecting the end pieces with the bottom comprising staples secured to the bottom, straps looped through said staples and secured to the lower marginal portions of the end pieces, folding side pieces hinged to the bottom piece, and guide wires at the inner faces of the end portions of said side pieces, said end pieces having loops which embrace said guide wires.

2. In a knock-down crate, the combination with a bottom and end pieces, of means pivotally connecting the end pieces with the bottom comprising staples secured to the bottom, straps looped through said staples and overlapping the lower marginal portions of the end pieces, and staples which embrace the outer ends of said straps for detachably securing the same to the end pieces.

3. In a knock-down crate, the combination with a bottom and end pieces formed of longitudinal and cross strips, of means pivotally connecting the end pieces with the bottom comprising staples secured to the bottom, and U-shaped straps looped through said staples, one end of each of said straps being fitted between the longitudinal and cross strips of the end piece, and the other end of said straps overlying the end pieces and being detachably secured thereto.

4. In a knock-down crate, the combination with a bottom and side pieces, of means pivotally connecting the side pieces with the bottom comprising flexible straps telescopically fitted in the marginal portions of the bottom and in the lower marginal portions of the side pieces.

5. In a knock-down crate, the combination with a bottom composed of longitudinal and cross strips, and side pieces also composed of longitudinal and cross strips, of means pivotally connecting the side pieces with the bottom comprising straps fitted between the longitudinal and cross strips of the bottom, and between the longitudinal and cross strips of the side pieces.

6. In a knock-down crate, the combination with a bottom composed of longitudinal and cross strips and narrow longitudinal strips at the side margins of the bottom, and side pieces composed of longitudinal and cross strips, of means connecting the side pieces with the bottom comprising straps having their lower ends fitted between the longitudinal and cross strips of the bottom, the intermediate portions of said straps being fitted between the cross strips of the bottom and said narrow longitudinal strips, and the upper ends of said straps being fittted between the longitudinal and cross strips of the side pieces.

7. In a knock-down crate, the combination with a bottom, folding side pieces, and end pieces, of means pivotally connecting the end pieces with the bottom comprising staples secured to the bottom, and straps looped through said staples and secured to the lower marginal portions of the end pieces, one of the ends of said straps being telescopically fitted in said end pieces.

EDGAR T. BOND.